L. S. MORSE.
TIRE TREAD FASTENER.
APPLICATION FILED JUNE 29, 1916.
1,238,553.
Patented Aug. 28, 1917.
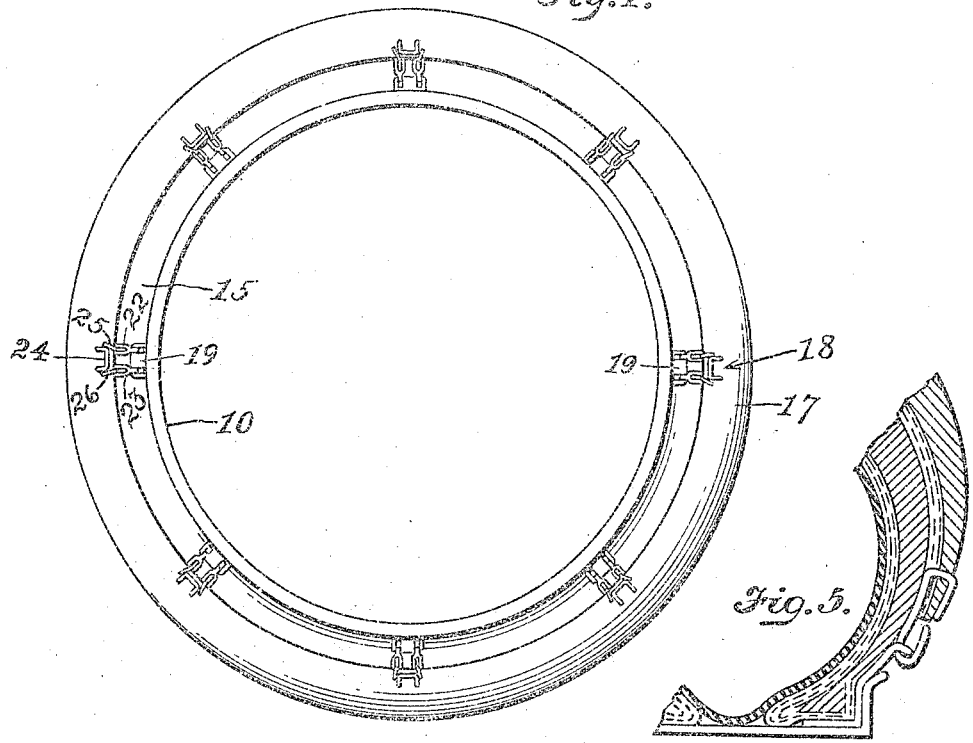
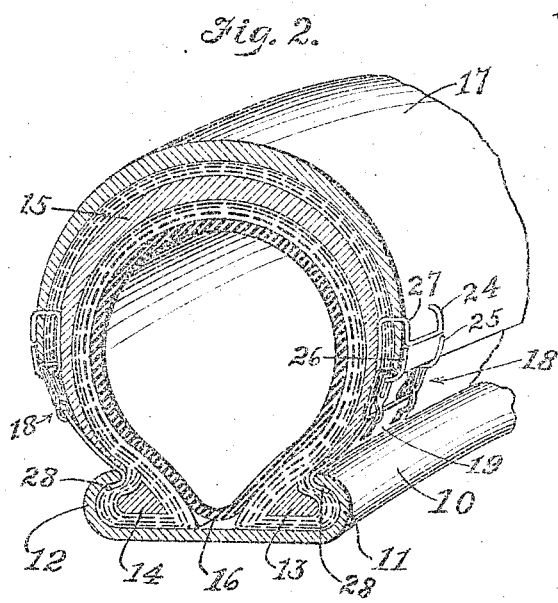
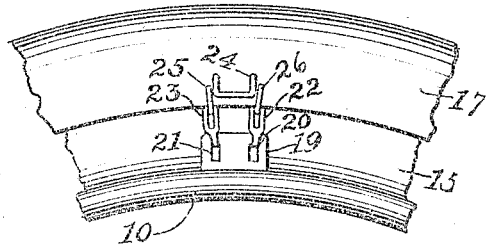
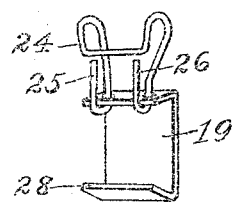
Inventor
Lulan S. Morse

UNITED STATES PATENT OFFICE.

LULAN S. MORSE, OF OCEANPARK, CALIFORNIA.

TIRE-TREAD FASTENER.

1,238,553.  Specification of Letters Patent.  Patented Aug. 28, 1917.

Application filed June 29, 1916. Serial No. 106,631.

*To all whom it may concern:*

Be it known that I, LULAN S. MORSE, a subject of the King of Great Britain, residing at Oceanpark, in the county of Los Angeles and State of California, have invented new and useful Improvements in Tire-Tread Fasteners, of which the following is a specification.

This invention relates to a retread for tires and particularly pertains to a fastening means therefor.

It has been found to be of considerable advantage to utilize the worn-out shoes of pneumatic tires as retreads. The shoes are suitably trimmed and secured over the tread of the tire casing. The manner in which these retreads have been secured upon the casings has, in most instances, been complicated and expensive in construction. It is the object of this invention to provide simple and inexpensive means for fastening a retread over a tire casing.

Another object is to provide simple means for applying the fastenings to the retread, said means eliminating the use of rivets and fastening plates.

Another object is to provide a fastener which will not readily become heated due to its light construction and will not absorb and hold heat to the detriment of the tire as is the case in fastening devices having heavy bodies and rivets which act to transmit heat from the exterior to the interior of the retread.

Another object is to provide means for demountably securing the retread over a casing and in engagement with the ordinary clencher rim as in common use.

Another object is to provide a retread fastening means which may be readily manufactured, of few inexpensive parts adapted to be interchanged without difficulty.

A further object is to provide a retread fastening member which is detachable and which may be readily adjusted to various sized tires.

Other objects will appear hereinafter.

The invention is illustrated in the accompanying drawings in which:

Figure 1 is a view in side elevation of a pneumatic tire mounted upon its clencher rim and equipped with a retread having the special fasteners thereon.

Fig. 2 is a view in perspective illustrating a fragmentary portion of a tire fitted with a retread and particularly showing the fastening members.

Fig. 3 is a view of a fragmentary portion of a tire as seen in side elevation and showing the fastener in position.

Fig. 4 is a perspective view of a modified form of the invention in which connecting links are eliminated.

Referring to the drawings more particularly, 10 indicates a clencher rim of any preferred construction between the upturned edges 11 and 12 of which are secured bead portions 13 and 14 of a tire shoe or casing. Within the casing 15 is a pneumatic tire tube 16 which is normally inflated and supports the casing 15 in the position indicated in Fig. 2 of the drawings. A retread shoe 17 is secured over the tread of the casing 15 and is formed of the body portion of a used casing, the beads having been removed to allow clearance between the retread and the upturned clencher flanges 11 and 12. As a means for securing the retread 17 upon a tire, a series of fastening members 18 is provided and embody the essence of this invention.

The fastening members 18 are formed with a rim engaging plate 19 which is bent along its lower marginal edge to be engaged by the upturned rim flanges 11 and 12. The main body of the plate 19 is formed with a pair of perforations 20 and 21 through which the links of chains 22 and 23 are passed. As shown in the drawings, but one link is used upon each side of the device. It is, however, evident that with tires of large diameter any number of links may be used in the chain in order to properly accommodate the enlarged dimensions. The upper ends of the chains are engaged by a staple member 24 which extends inwardly from the casing and is formed with a pair of end portions 25 and 26 which pass through perforations made along the marginal edge of the retread and inwardly into engagement with the chains and act to secure the device to the tread, the ends of the members being bent outwardly after passing through the chains. The outer end of the staple member is formed with a loop 27 which extends outwardly and is adapted to bend inwardly between the perforations of the retread and upon the outside of the casing and act to secure the staple in a rigid manner upon the casing without tearing it between the perforations. The fastening members are applied to the retread by first perforating through the marginal edges of the retread at suitable intervals, these perforations being made with a suitable punch or awl and are of a size to receive the portions 25 and 26 of the staple. The staple, after passing through the perforations, extends inwardly and engages the links of the chains after which its ends are bent outwardly to secure them. It may be stated that any number of fasteners may be thus applied to the retread. However, it has been found that six on each side is sufficient to satisfactorily hold a retread of ordinary dimensions.

The modified form is applied in a similar manner save for the links.

When the fasteners are in place upon the retread, the tire and its retread member may be mounted upon the clencher rim of a wheel, the tire being placed thereon in the ordinary manner. Simultaneously with the positioning of the tire upon the rim, the fastening members are hooked beneath the clencher engaging beads at each side of the clencher rim, the fasteners being there secured by the hook portions 28 which are formed along the lower marginal edge of the fastener plates 19.

When a retread casing is to be applied to a pneumatic tire having straight sides, the hook portions 28 are turned inwardly toward each other and around the corners of the tire formed by the sides of the tire and its inner periphery. The plates will then be held in place by the clencher rings.

It will thus be seen that the retread and fasteners here provided may readily be applied to the casing of most pneumatic tires in use and will lend themselves to various adjustments to accommodate tires of various dimentions as well as be of a construction which is readily and simply assembled.

I claim:

1. A fastener for pneumatic tire retread members comprising a staple formed with a body portion adapted to bear against the outer face of the retread member and having a pair of legs extending inwardly through the wall of the retread and thereafter bent laterally and outwardly over the marginal edge thereof, a body plate movably secured to said laterally extending leg portions, and a laterally extending inner flange adapted to engage the flange of a clencher rim and be secured thereby.

2. A fastener for pneumatic tire retread casings, comprising a staple adapted to pass through the wall of the retread from its outer face and to be extended outwardly over the marginal edge of said retread, a plate adapted to be secured by said outwardly extending portion, and an angularly disposed securing flange formed upon said plate and adapted to be engaged to hold the retread in position.

In testimony whereof I have signed my name to this specification.

LULAN S. MORSE.